United States Patent
Kai

(10) Patent No.: US 9,260,067 B2
(45) Date of Patent: Feb. 16, 2016

(54) ONBOARD BATTERY MANAGEMENT SYSTEM

(71) Applicant: HONDA MOTOR CO., LTD, Tokyo (JP)

(72) Inventor: Takeshi Kai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 594 days.

(21) Appl. No.: 13/721,398

(22) Filed: Dec. 20, 2012

(65) Prior Publication Data

US 2013/0154358 A1 Jun. 20, 2013

(30) Foreign Application Priority Data

Dec. 20, 2011 (JP) ................................. 2011-278059

(51) Int. Cl.
*B60R 16/033* (2006.01)
*B60R 16/023* (2006.01)

(52) U.S. Cl.
CPC ........... *B60R 16/033* (2013.01); *B60R 16/0232* (2013.01)

(58) Field of Classification Search
CPC .......................... B60R 16/033; B60R 16/0232
USPC ......................................................... 307/10.7
See application file for complete search history.

(56) References Cited

U.S. PATENT DOCUMENTS

| 2002/0130769 A1* | 9/2002 | Yamagishi .................... 340/426 |
| 2010/0066302 A1* | 3/2010 | Gregg et al. .................. 320/104 |
| 2011/0282527 A1* | 11/2011 | Inbarajan et al. ............... 701/22 |

FOREIGN PATENT DOCUMENTS

| JP | 2006-347299 A | 12/2006 |
| JP | 3878464 B2 | 2/2007 |
| JP | 2008-290513 A | 12/2008 |
| JP | 2010-183689 A | 8/2010 |
| JP | 2011-82937 A | 4/2011 |

OTHER PUBLICATIONS

Japanese Office Action mailed Sep. 3, 2014, issued in corresponding Application No. 2011-278059. (3 pages).
Chinese Office Action dated Sep. 3, 2014, issued in corresponding Chinese Application No. 201210539213.2 (12 pages).
Japanese Office Action mailed Nov. 19, 2013, issued in corresponding Japanese Application No. 2011-278059. (2 pages).

* cited by examiner

*Primary Examiner* — Scott Bauer
(74) *Attorney, Agent, or Firm* — Westerman, Hattori, Daniels & Adrian, LLP

(57) ABSTRACT

When a low charge state where the charge remaining amount of a battery that supplies power to onboard equipment is at or below a predetermined amount or an abnormal state of the battery is detected, the detection is notified to a server through a communication section. The state notified to the server is recorded in a storage section. When a portable terminal inquires of the server, the state of the battery recorded in the storage section is transmitted to the portable terminal. The portable terminal displays information as to the state of the battery received from the server.

17 Claims, 6 Drawing Sheets

ONBOARD BATTERY MANAGEMENT SYSTEM

CROSS REFERENCES TO RELATED APPLICATIONS

The present application claims priority under 35 U.S.C. §119 to Japanese Patent Application No. 2011-278059, filed Dec. 20, 2011, entitled "Onboard Battery Management System." The contents of this application are incorporated herein by reference in their entirety.

TECHNICAL FIELD

The present disclosure relates to an onboard battery management system for monitoring a state of a battery that supplies power to electric equipment (onboard equipment) mounted on a vehicle.

BACKGROUND

A system for monitoring a charge rate (a charge remaining amount) of a battery that is mounted on a vehicle employing a motor as a power source and that supplies power to the motor is illustrated in Japanese Unexamined Patent Application Publication No. 2011-82937. In this system, a signal indicating the charge rate of the battery is repeatedly transmitted from the vehicle to the center, the center records the charge rate indicated in the transmitted signals, a cellular phone of a user of the vehicle repeatedly inquires of the center about the charge rate of the battery, and the latest charge rate is displayed on the standby screen of the cellular phone. This enables the user to easily know the latest charge rate in a location remote from the vehicle without having to operate the cellular phone.

In a vehicle including a battery for supplying power to electrical equipment (e.g., an air-conditioning device) mounted on the vehicle (hereinafter referred to as "onboard-equipment battery") and a generating device for charging the onboard-equipment battery, the maximum charging capacity of the onboard-equipment battery is smaller than that of the power source driving battery. Thus if the above-described system is used, there is a problem in that information indicating the charge rate of the battery is transmitted repeatedly and these transmitting operations consume the battery and reduce the charge rate of the battery.

SUMMARY

The present application describes an onboard battery management system that enables a user remote from a vehicle to appropriately know a state of an onboard-equipment battery having a relatively small capacity and mounted on the vehicle.

An onboard battery management system according to an aspect of the present application includes a vehicle, a portable terminal, and a server. The vehicle includes a generating unit, a battery charged with power generated by the generating unit, an onboard equipment operating with power output from the battery, and a notifying unit that provides a notification of a state of the battery. The portable terminal is configured to allow the onboard equipment to be operated therethrough. The server is capable of carrying out wireless communication with the notifying unit and the portable terminal. The notifying unit includes a monitoring unit that detects a low charge state where a charge remaining amount of the battery is at or below a predetermined amount or an abnormal state of the battery. When the low charge state or the abnormal state is detected by the monitoring unit, the notifying unit notifies the server of the detection. The portable terminal is capable of inquiring of the server about the state of the battery notified to the server by the notifying unit.

With the above-described onboard battery management system, when the low charge state where the charge remaining amount of the battery supplying power to the onboard equipment is at or below the predetermined amount or the abnormal state of the battery is detected, the detection is notified to the server. The portable terminal is capable of inquiring of the server about the state of the battery notified to the server. Accordingly, if the user fails to operate the onboard equipment through the portable terminal, the user can know the cause of the failure by inquiring of the server using the portable terminal and can promptly handle the situation. That is, when the battery is in the low charge state or the abnormal state, the situation can be handled by charging or replacement of the battery. When the cause of the failure is not a low charge state or an abnormal state of the battery, other measures (e.g., checking the communication environment between the onboard equipment and the portable terminal) can be taken.

In the above-described onboard battery management system, the generating unit may generate the power using at least one of light, heat, and an electromagnetic wave.

With the above-described onboard battery management system, because the battery is charged with the power generated using at least one of light, heat, and an electromagnetic wave, the charged state of the battery is susceptible to the environment where the vehicle is used and the environment where the vehicle is kept, and the frequency of becoming a low charge state is expected to be high. Accordingly, the effect of reducing power consumption of the battery is noticeably achieved by not always providing notification to the server, and the user can easily know a low charge state or an abnormal state of the battery at a remote site while power consumption of the battery is suppressed.

In the above-described onboard battery management system, the vehicle may further include a driving battery that supplies power to a power source for driving the vehicle, and the battery charged with the power generated by the generating unit may differ from the driving battery and may have a maximum charging capacity smaller than that of the driving battery.

With the above-described onboard battery management system, because the onboard-equipment battery charged with the power generated by the generating unit differs from the driving battery for the vehicle and has the maximum charging capacity smaller than that of the driving battery, the effect of reducing power consumption of the onboard-equipment battery achieved by not always providing notification to the server is noticeable, and the user can easily know a low charge state or an abnormal state of the battery at a remote site while power consumption of the battery is suppressed.

In the above-described onboard battery management system, the notifying unit may provide the notification of the low charge state by use of power output from the driving battery.

With the above-described onboard battery management system, because the notification of the low charge state is provided to the server by use of the power output from the driving battery, the low charge state of the onboard-equipment battery can be reliably notified to the server.

In the above-described onboard battery management system, when the battery is shifted from the low charge state by being charged, the notifying unit may notify the server of the shift.

With the above-described onboard battery management system, because the shift is notified to the server when the battery is shifted from the low charge state by being charged, the user can know the return from the low charge state to a normal state. In addition, the notifying unit may notify the server of the present charge amount of the battery, and the present charge amount of the battery may be checked by the user employing the portable terminal.

BRIEF DESCRIPTION OF THE DRAWINGS

The advantages of the disclosure will become apparent in the following description taken in conjunction with the following drawings.

DETAILED DESCRIPTION

Embodiments are described below with reference to the drawings.

First Embodiment

Figure 1:
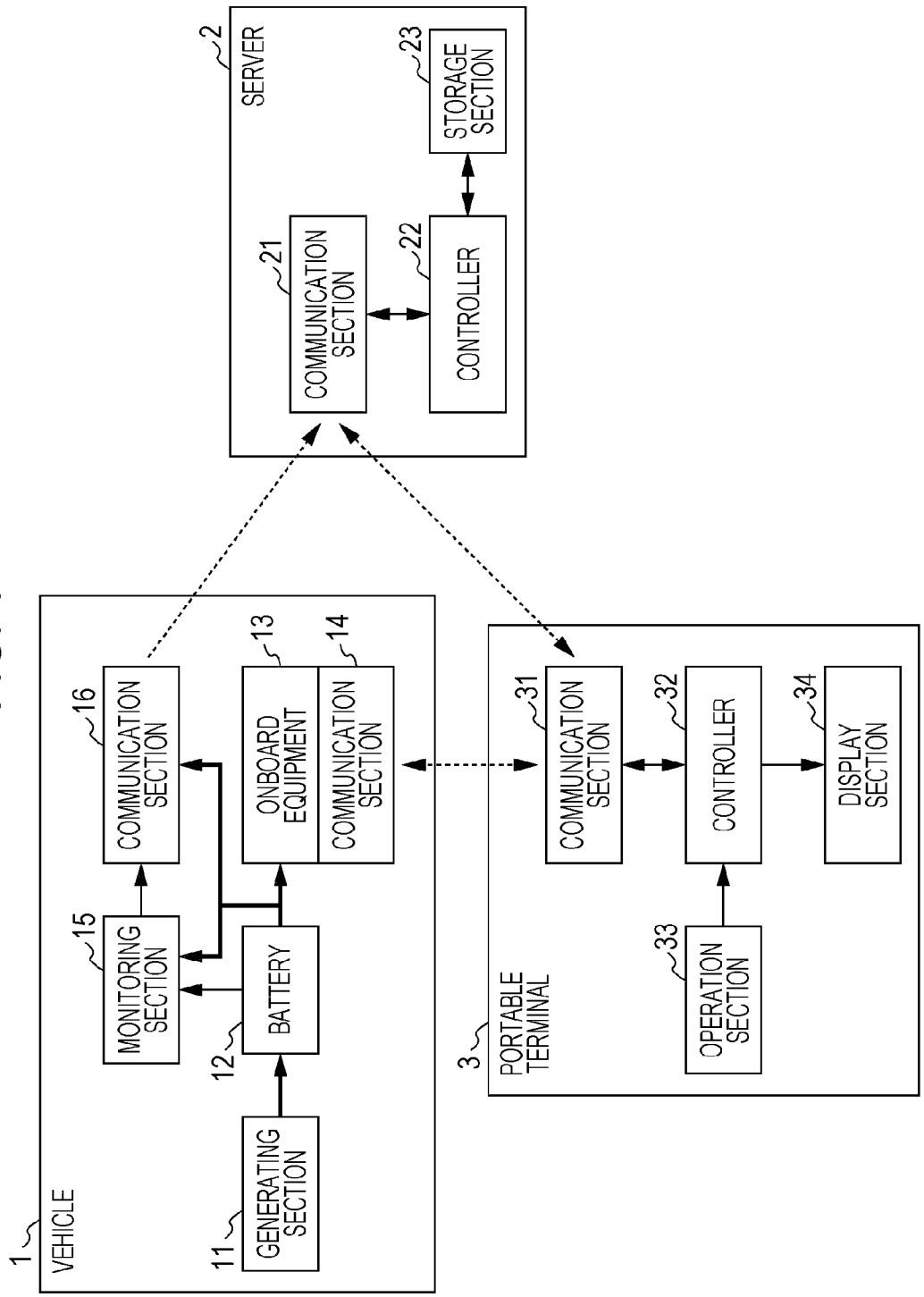
FIG. 1 is a block diagram that illustrates the configuration of an onboard battery management system according to a first embodiment.

FIG. 1 is a block diagram that illustrates the configuration of an onboard battery management system according to a first embodiment. This system includes a vehicle 1, a server 2, and a portable terminal 3.

The vehicle 1 is a vehicle driven by an internal combustion engine and includes an internal combustion engine (not illustrated), an alternating-current (AC) generator driven by the internal combustion engine, a vehicle driving system driven by the internal combustion engine, and a control device for them. The vehicle 1 further includes a generating section 11, which differs from the above-described AC generator, a battery 12 charged with power from the generating section 11, an onboard equipment 13 (e.g., an air-conditioning device) operating with power output from the battery 12, a communication section 14 for use in remotely operating the onboard equipment 13 through the portable terminal 3, a monitoring section 15 that monitors a state of the battery 12 (charge remaining amount CHR, presence or absence of anomaly), and a communication section 16 for use in notifying the server 2 of a predetermined battery state detected by the monitoring section 15 by wireless communication. In the present embodiment, when a low charge state where the charge remaining amount CHR is at or below a predetermined amount CHRTH or an abnormal state of the battery 12 is detected, that detection is notified to the server 2. The monitoring section 15 may be implemented by, for example, a processor that performs or provides various functions such as those described in the present application by executing a program. In the present application, the term program generally refers to a set of coded instructions that enable a computer or a processor to perform a specified function. Programs may be generally stored on a storage device such as memory. Further, programs may be implemented internally or externally to a system, while remaining accessible by that system.

The generating section 11 generates power by converting the energy of sunlight into electric power (conversion of light into electric power) and converting heat of the internal combustion engine directly into electric power (conversion of heat into electric power). The conversion of light into electric power is achieved by the use of a known solar cell. The conversion of heat into electric power is achieved by employing a publicly known technique utilizing the Seebeck effect. Power generated by the generating section 11 is smaller than that by the above-described AC generator.

The battery 12 is a battery that differs from the engine driving battery used in igniting the internal combustion engine and other actions and that is for supplying power to the onboard equipment 13. Because electric power generated by the generating section 11 is relatively small, the maximum charging capacity CHMAX of the battery 12 is smaller than the maximum charging capacity of the engine driving battery. In the present embodiment, power for the monitoring section 15 and the communication section 16 is supplied from the battery 12.

The server 2 includes a communication section 21 for carrying out wireless communication with the vehicle 1 and the portable terminal 3, a controller 22 that performs control for recording the latest state of the battery 12 in the server 2, and a storage section 23 that stores obtained information. The controller 22 performs control for recording information regarding the state of the battery 12 transmitted from the vehicle 1 and control for responding to an inquiry about the state of the battery from the portable terminal 3. For example, the server 2 may be implemented by a computer that performs or provides various functions such as those described in the present application by means of a processor which executes a program. In this case, the controller 22 may be implemented by the processor of the server. The server 2 may be a server machine connected to a network and also may be implemented as a cloud server in a cloud computing environment. The storage section 23 may be implemented by a memory device.

The portable terminal 3 is possessed by the user of the vehicle 1. Examples of the portable terminal 3 can include a smartphone and a tablet computer. The portable terminal 3 includes a communication section 31, a controller 32, an operation section 33, and a display section 34. The communication section 31 carries out wireless communication with the communication section 14 of the vehicle 1 and the communication section 21 of the server 2.

The portable terminal 3 has the functions of enabling the user to remotely operate the onboard equipment 13 through the communication section 31 and the communication section 14 and of inquiring of the server 2 about the state of the battery 12 by operating the operation section 33. The controller 32 may be implemented by, for example, a processor that performs or provides various functions such as those described in the present application by executing a program.

The onboard equipment 13 performs an action corresponding to operation information input through the communication section 14 and transmits notification of completion of the action (if the action has failed to be completed, notification of anomaly) to the portable terminal 3 through the communication section 14.

When remotely operating the onboard equipment 13 using the portable terminal 3, for example, and receiving notification of anomaly from the onboard equipment 13, the user can inquire of the server 2 about the state of the battery 12 using the portable terminal 3. The wireless communication between the vehicle 1 and the portable terminal 3, the vehicle 1 and the server 2, and the server 2 and the portable terminal 3 may be implemented by using a known wireless communication technology, for example, Wireless Wide Area Network (WWAN), Wireless Local Area Network (WLAN) or Bluetooth.

Figure 2:
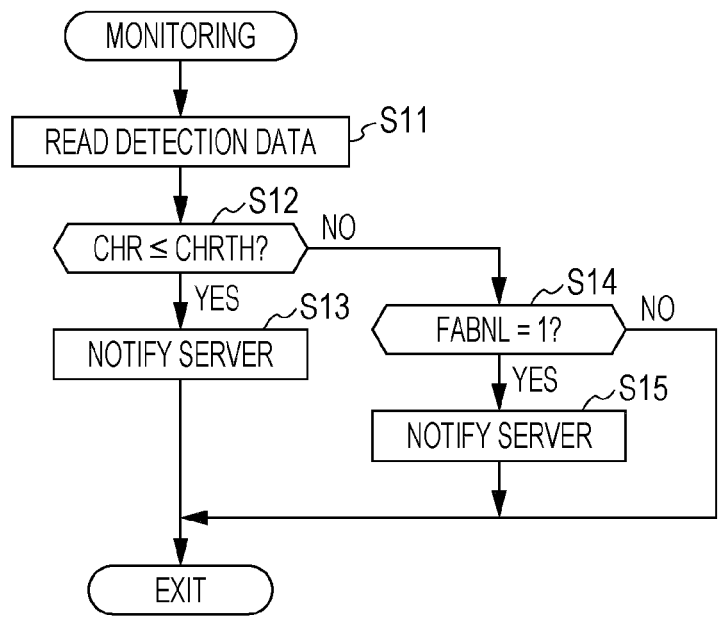
FIG. 2 is a flowchart of a process performed by a monitoring section of a vehicle.

FIG. 2 is a flowchart of a process performed by the monitoring section 15 of the vehicle 1. This process is executed for each predetermined time period.

In step S11, detection data on the battery 12 is read. In the present embodiment, the charge remaining amount CHR (indicated by the ratio to the full charging amount), a battery temperature TB, and an output voltage VB are read. In step S12, it is determined whether the charge remaining amount CHR is at or below the predetermined amount CHRTH (e.g., 0.3). When the answer in step S12 is positive (YES), which means that the battery 12 is in a low charge state, this situation is notified to the server 2 through the communication section 16 (step S13).

When the answer in step S12 is negative (NO), it is determined whether an anomalous flag FABNL is "1" (step S14). For example, when the battery temperature TB is outside the range between the predetermined upper and lower temperature limits or when the output voltage VB is outside the range of the predetermined upper and lower voltage limits, the battery 12 is determined to be anomalous and the anomalous flag FABNL is set at "1."

When the answer in step S14 is positive (YES), the situation where the battery 12 is in an abnormal state is notified to the server 2 (step S15). When the FABNL is 0 in step S14, the process immediately ends. Accordingly, this process may be implemented as the event of the detection of the low charge state or the abnormal state calls or activates the notification function so as to notify the server of such a detection.

Figure 3:
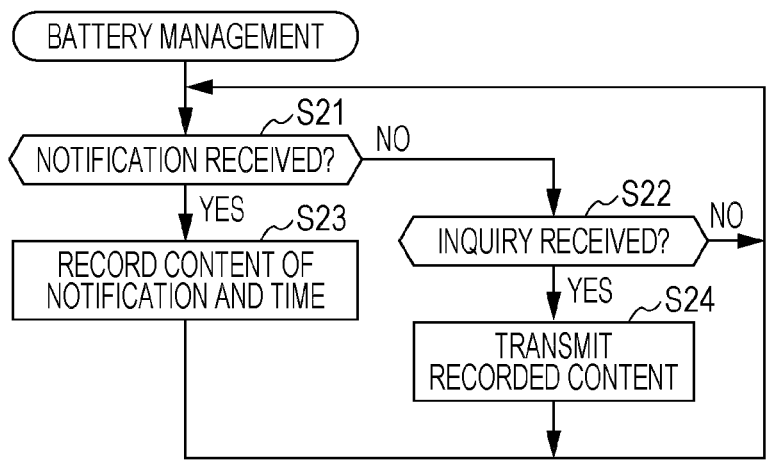
FIG. 3 is a flowchart of a process performed by a controller of a server.

FIG. 3 is a flowchart of a battery management process performed by the controller 22 of the server 2. In steps S21 and S22, the controller 22 waits for notification about the state of the battery from the vehicle 1 and inquiry from the portable terminal 3. When the notification from the vehicle 1 is received, the process proceeds from step S21 to step S23. In step S23, the content of the notification and the time of the receipt are recorded in the storage section 23, and the process returns to step S21.

When the inquiry from the portable terminal 3 is received, the process proceeds from step S22 to step S24. In step S24, the recorded content is read from the storage section 23 and transmitted to the portable terminal 3. If there is no record concerning the state of the battery 12 in the storage section 23, which means that the battery 12 is in a normal state (state where neither a low charge state nor an abnormal state is detected), information indicating that normal state is transmitted to the portable terminal 3.

Figure 4:
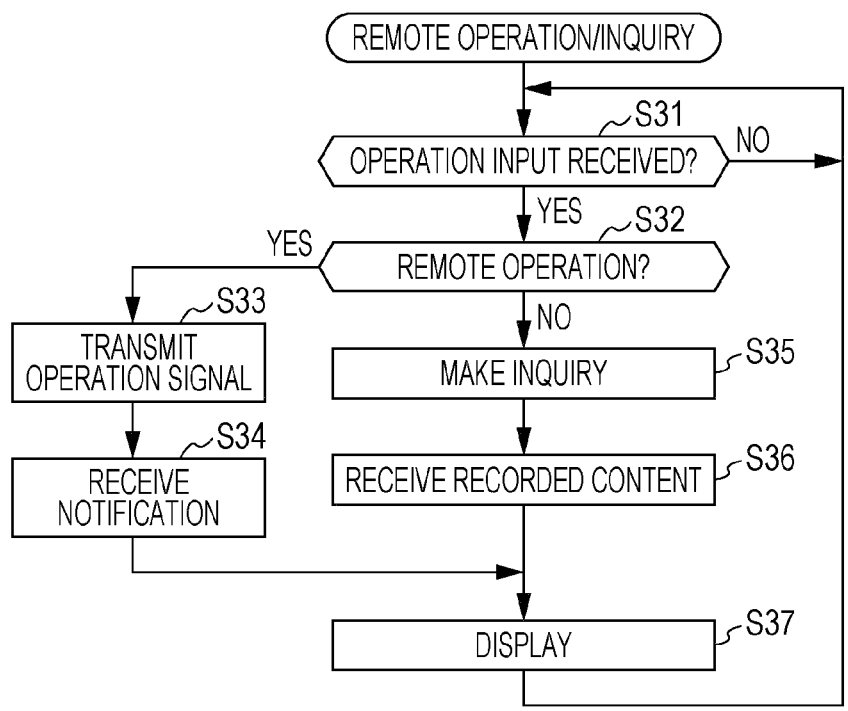
FIG. 4 is a flowchart of a process performed by a controller of a portable terminal.

FIG. 4 is a flowchart of a remote operation/inquiry process performed by the controller 32 of the portable terminal 3.

In step S31, the controller 32 waits for an operation input from the user. When the operation input is received, the process proceeds from step S31 to step S32. In step S32, it is determined whether the received operation input is an input for remotely operating the onboard equipment 13. When the answer in step S32 is positive (YES), the operation information is transmitted to the vehicle 1 through the communication section 31 (step S33).

In response to this, the onboard equipment 13 performs an action corresponding to the operation information and transmits completion notification indicating that the action has been completed or anomaly notification that the action has failed to be completed to the portable terminal 3 through the communication section 14 (not illustrated).

In step S34, the controller 32 receives the notification from the onboard equipment 13 and displays the received content on the display section 34 (step S37).

When the answer in step S32 is negative (NO) and the received operation input is an input for inquiring about the state of the battery, the controller 32 transmits an inquiry signal to the server 2 (step S35). When the server 2 transmits the recorded content in response to the inquiry, the controller 32 receives the transmitted recorded content (step S36) and displays the received content on the display section 34 (step S37).

As described above, in the present embodiment, when a low charge state where the charge remaining amount CHR of the battery 12 supplying power to the onboard equipment 13 is at or below the predetermined amount CHRTH or an abnormal state of the battery 12 is detected, the detection is notified to the server 2. The portable terminal 3 can inquire of the server 2 about the state of the battery 12 notified to the server 2. Thus, for example, if the user remotely operates the onboard equipment 13 by the use of the portable terminal 3 and receives anomaly notification, the user can know the cause and deal speedily with that situation by making an inquiry to the server 2 using the portable terminal 3. That is, if the battery 12 is in a low charge state, the user can deal with it by charging the battery 12 by starting the internal combustion engine to generate heat or by moving the vehicle to a place in sunlight. If the battery 12 is in an abnormal state, the user can deal with it by replacing the battery 12. If the low charge state or abnormal state of the battery 12 is not the cause of being unable to remotely operate the onboard equipment 13, other measures, such as checking the communication environment between the onboard equipment 13 (communication section 14) and the portable terminal 3 (communication section 31), can be taken.

Because the battery is charged with power generated by conversion of light into electric power and conversion of heat into electric power by the generating section 11, the charged state of the battery 12 is susceptible to the environment where the vehicle is used and the environment where the vehicle is kept, and the frequency of becoming a low charge state is expected to be high. Accordingly, the effect of reducing power consumption of the battery 12 achieved by not always providing notification to the server 2 is noticeable, and the user can easily know a low charge state or an abnormal state of the battery at a remote site while power consumption of the battery is suppressed.

In the present embodiment, the generating section 11 corresponds to the generating unit, the monitoring section 15 corresponds to the monitoring unit, and the monitoring section 15 and the communication section 16 correspond to the notifying unit. Moreover, the communication section 21 corresponds to the receiving unit, accepting unit, and transmitting unit in the battery management server. The storage section 23 corresponds to the storage unit in the battery management server. These respective correspondences between the units and the specific elements of this embodiment are presented as mere examples, and thus, should not be interpreted to limit the scope of the accompanying claims to these examples.

[Variation]

Figure 5:
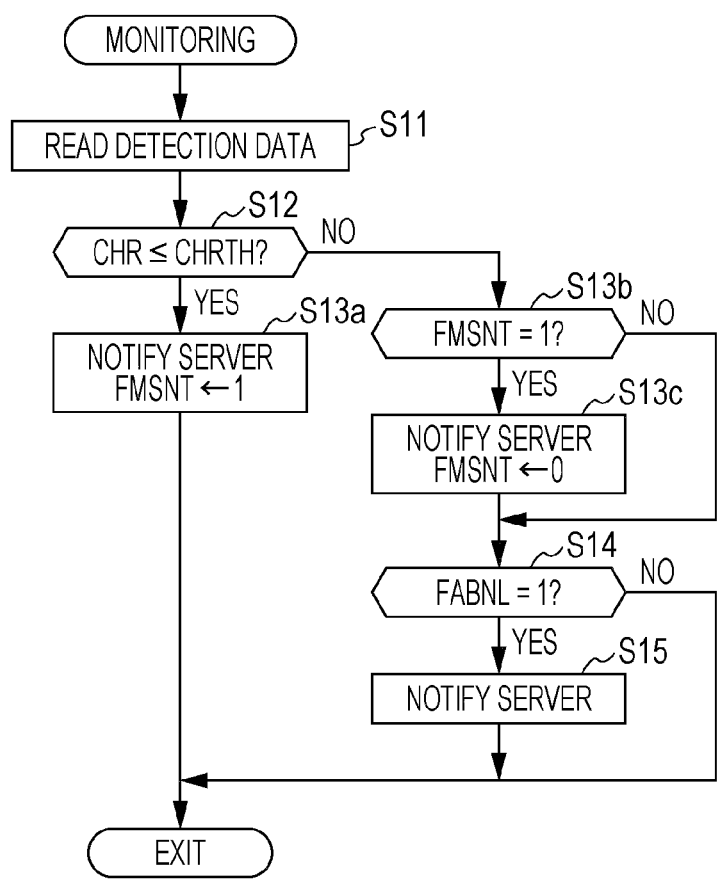
FIG. 5 is a flowchart that illustrates a process in a variation of the process illustrated in FIG. 2.

The process by the monitoring section 15 illustrated in FIG. 2 may be modified into a process illustrated in FIG. 5. In FIG. 5, step S13 of FIG. 2 is changed to step S13a, and steps S13b and S13c are added.

In step S13a, the monitoring section 15 notifies the server 2 that the battery 12 is in a low charge state and sets a notification completion flag FMSNT as "1" indicating that the notification has been made. In step S13b, it is determined whether the notification completion flag FMSNT is "1." When the answer is positive (YES), the server 2 is notified that the battery 12 has been returned from the low charge state to a normal state by being charged, and the notification completion flag FMSNT is returned to "0" (step S13c). When the answer in step S13b is negative (NO), the process proceeds directly to step S14.

In this variation, when the battery 12 is shifted from a low charge state to a normal state by being charged, the shift is notified to the server 2. Thus the user can know that the battery 12 is returned from a low charge state to a normal state.

Second Embodiment

Figure 6:
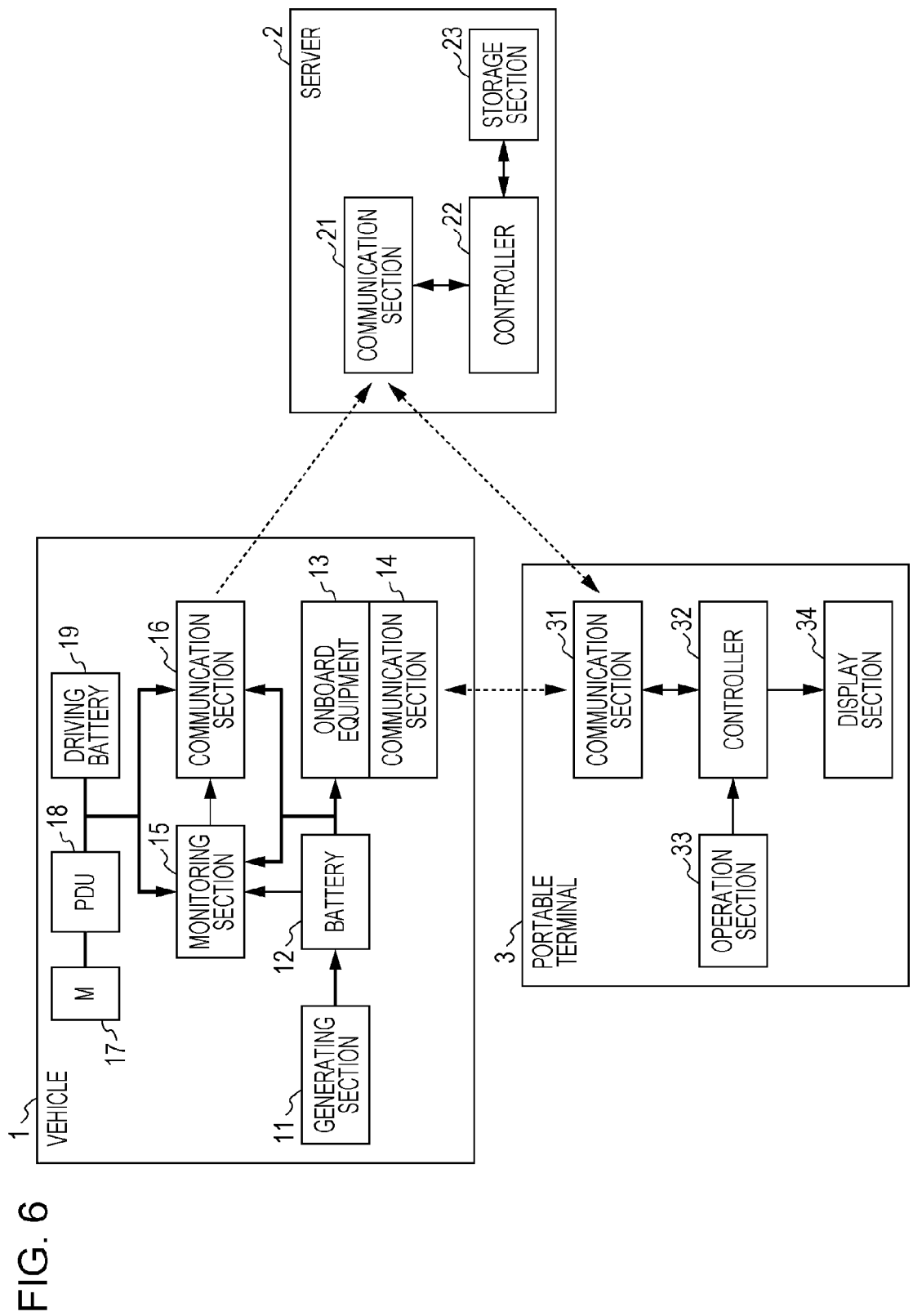
FIG. 6 is a block diagram that illustrates the configuration of the onboard battery management system according to a second embodiment.

FIG. 6 is a block diagram that illustrates the configuration of the onboard battery management system according to a second embodiment. The present embodiment is the same as the first embodiment, except for the points described below.

In the present embodiment, the vehicle 1 is a hybrid vehicle and includes, in addition to the internal combustion engine (not illustrated), a motor 17 as a power source, a power drive unit (PDU) 18 for driving the motor 17, and a driving battery 19 supplying power to the motor 17. The motor 17 also functions as a generator (functions as the AC generator in the first embodiment). The maximum charging capacity CHMAXD of the driving battery 19 is larger than the maximum charging capacity CHMAX of the onboard battery 12.

The driving battery 19 is also connected to the monitoring section 15 and the communication section 16. The monitoring section 15 and the communication section 16 can also receive power supplied from the driving battery 19.

Figure 7:
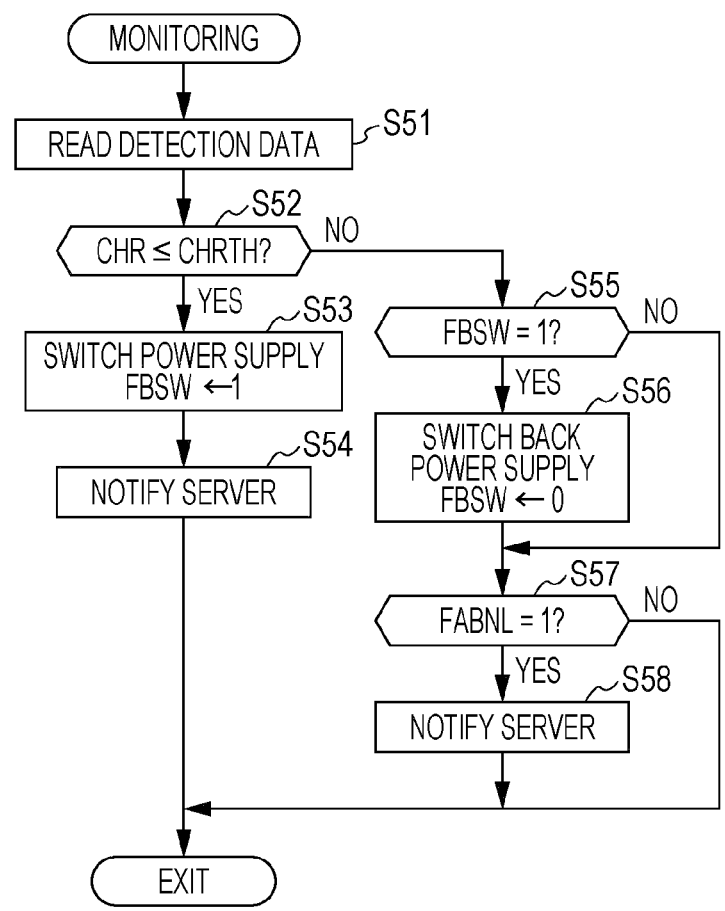
FIG. 7 is a flowchart of a process performed by the monitoring section of the vehicle (second embodiment).

FIG. 7 is a flowchart of a process performed by the monitoring section 15. Steps S51, S52, S54, S57, and S58 in FIG. 7 correspond to steps S11, S12, S13, S14, and S15 in FIG. 2, respectively. That is, the process in FIG. 7 corresponds to one in which steps S53, S55, and S56 are added to the process in FIG. 2.

When a low charge state of the battery 12 is detected in step S52 in FIG. 7, the process proceeds to step S53, where the power supply is switched and a power-supply switching flag FBSW indicating that switching is set at "1." That is, the monitoring section 15 and the communication section 16 receive power supplied from the battery 12 in a normal state, whereas the power supply is switched in a low charge state such that they receive power supplied from the driving battery 19.

When the battery 12 is not in a low charge state, it is determined in step S55 whether the power-supply switching flag FBSW is "1." When the answer is positive (YES), the power supply is switched so as to be returned (switched back), and the power-supply switching flag FBSW is returned to "0" (step S56). When the answer in step S55 is negative (NO), the process proceeds directly to step S57.

In the present embodiment, the battery 12 charged with power generated by the generating section 11 differs from the driving battery 19 in the vehicle 1, and the maximum charging capacity CHMAX of the battery 12 is smaller than the maximum charging capacity CHMAXD of the driving battery 19. Accordingly, the effect of reducing power consumption of the battery 12 achieved by not always providing notification to the server 2 is noticeable, and the user can easily know a low charge state or an abnormal state of the battery at a remote site while power consumption of the battery is suppressed.

In addition, because the power supply for the monitoring section 15 and the communication section 16 is switched from the battery 12 to the driving battery 19 in a low charge state, there is no shortage of power required to notify the server 2, and the low charge state of the battery 12 can be reliably notified to the server 2.

[Variation]

In the present embodiment, when the battery 12 is returned from a low charge state to a normal state, the return may be notified to the server 2, as in the variation of the first embodiment.

The present application is not limited to the above-described embodiments, and various modifications may be made. For example, the generating section 11, which is described in the above-described embodiments as converting light into electric power and converting heat into electric power, may convert electromagnetic waves into electric power. Conversion of electromagnetic waves into electric power is a power generation method of converting energy of electromagnetic waves propagating in the air into electric power, and this method is described in, for example, Japanese Patent No. 3878464, the entire contents of which are incorporated herein by reference.

Of the above-described three power generation techniques, any one, any two, or all three techniques may be used. Power generation methods other than the above ones, for example, power generation by the use of vibration and power generation by electromagnetic induction, may also be used.

In the above-described embodiments, the present application is applied to a vehicle that uses one power source of the internal combustion engine and a hybrid vehicle that uses two power sources of the internal combustion engine and the motor. The present application is also applicable to a vehicle that uses one power source of the motor.

The portable terminal in the present application is not limited to the one including the controller performing the process illustrated in FIG. 4. For example, a simple remote controller may also be used that has the functions of sending an operation signal to the onboard equipment, of sending an inquiry signal to the server, and of receiving answer information from the server and displaying it, on the basis of an operation by the user.

We claim:

1. An onboard battery management system comprising:
a vehicle including a generating unit, a battery charged with power generated by the generating unit, an onboard equipment operating with power supplied from the battery, and a notifying unit providing a notification of a state of the battery;
a portable terminal capable of operating the onboard equipment; and
a server wirelessly communicating with the notifying unit and the portable terminal,
wherein the notifying unit includes a monitoring unit detecting a low charge state of the battery where a charge remaining amount of the battery is at or below a predetermined amount or an abnormal state of the battery,
when the low charge state or the abnormal state is detected by the monitoring unit, the notifying unit notifies the server of the detection of the low charge state or the abnormal state, and the portable terminal inquiries of the server about the state of the battery notified to the server by the notifying unit, wherein the vehicle further includes a driving battery that supplies power to a power source for driving the vehicle, and the battery charged with the power generated by the generating unit differs from the driving battery and has a maximum charging capacity smaller than that of the driving battery, wherein the notifying unit is supplied power from the battery, and the notifying unit switches a power source from the battery to the driving battery when notifying the server of the low charge state.

2. The onboard battery management system according to claim 1, wherein the generating unit generates the power using at least one of light, heat, and an electromagnetic wave.

3. The onboard battery management system according to claim 1, wherein the notifying unit provides the notification of the low charge state by use of power output from the driving battery.

4. The onboard battery management system according to claim 1, wherein when the battery is shifted from the low charge state to a normal state by being charged, the notifying unit notifies the server of the shift to the normal state.

5. An onboard battery management system comprising:
a vehicle including a generating means, a battery charged with power generated by the generating means, an onboard equipment operating with power supplied from the battery, and a notifying means for providing a notification of a state of the battery;
a portable terminal capable of operating the onboard equipment; and
a server wirelessly communicating with the notifying means and the portable terminal,
wherein the notifying means includes a monitoring means for detecting a low charge state of the battery where a charge remaining amount of the battery is at or below a predetermined amount or an abnormal state of the battery,
when the low charge state or the abnormal state is detected by the monitoring means, the notifying means notifies the server of the detection of the low charge state or the abnormal state, and
the portable terminal inquiries of the server about the state of the battery notified to the server by the notifying means,
wherein the vehicle further includes a driving battery that supplies power to a power source for driving the vehicle, and
the battery charged with the power generated by the generating means differs from the driving battery and has a maximum charging capacity smaller than that of the driving battery,
wherein the notifying means is supplied power from the battery, and the notifying means switches a power source from the battery to the driving battery when notifying the server of the low charge state.

6. The onboard battery management system according to claim 5, wherein the generating means generates the power using at least one of light, heat, and an electromagnetic wave.

7. The onboard battery management system according to claim 5, wherein the notifying means provides the notification of the low charge state by use of power output from the driving battery.

8. The onboard battery management system according to claim 5, wherein when the battery is shifted from the low charge state to a normal state by being charged, the notifying means notifies the server of the shift to the normal state.

9. An onboard battery management apparatus for a vehicle including a generator, a battery charged with power generated by the generator, an onboard equipment operating with power supplied from the battery, the apparatus comprising:
a notifying unit wirelessly communicating with a server and providing a notification of a state of the battery to the server;
wherein the notifying unit includes a monitoring unit detecting a low charge state of the battery where a charge remaining amount of the battery is at or below a predetermined amount or an abnormal state of the battery,
when the low charge state or the abnormal state is detected by the monitoring unit, the notifying unit notifies the server of the detection of the low charge state or the abnormal state,
wherein the vehicle further includes a driving battery that supplies power to a power source for driving the vehicle, and
the battery charged with the power generated by the generator differs from the driving battery and has a maximum charging capacity smaller than that of the driving battery,
wherein the notifying unit is supplied power from the battery, and the notifying unit switches a power source from the battery to the driving battery when notifying the server of the low charge state.

10. The onboard battery management apparatus according to claim 9, wherein the generating unit generates the power using at least one of light, heat, and an electromagnetic wave.

11. The onboard battery management apparatus according to claim 9, wherein the notifying unit provides the notification of the low charge state by use of power output from the driving battery.

12. The onboard battery management apparatus according to claim 9, wherein when the battery is shifted from the low charge state to a normal state by being charged, the notifying unit notifies the server of the shift to the normal state.

13. An onboard battery management method for a vehicle including a generating unit, a battery charged with power generated by the generating unit, an onboard equipment operating with power supplied from the battery, and a notifying unit providing a notification of a state of the battery, wherein the onboard equipment is capable of receiving an operational instruction from a portable terminal and the notifying unit is capable of wirelessly communicating with a sever, the method comprising:
detecting, by the notifying unit, a low charge state of the battery where a charge remaining amount of the battery is at or below a predetermined amount or an abnormal state of the battery and notifying the server of the detection of the low charge state or the abnormal state;
storing, by the server, the notified low charge state or abnormal state information to a storage device; and
wirelessly accessing, by the portable terminal, to the server and inquiring the state of the battery stored to the storage device,
wherein the vehicle further includes a driving battery that supplies power to a power source for driving the vehicle, and
the battery charged with the power generated by the generating unit differs from the driving battery and has a maximum charging capacity smaller than that of the driving battery,
wherein the notifying unit is supplied power from the battery, and the method further comprising:

switching, by the notifying unit, a power source from the battery to the driving battery when notifying the server of the low charge state.

14. The method according to claim 13, wherein the generating unit generates the power using at least one of light, heat, and an electromagnetic wave.

15. The method according to claim 13, wherein the notifying step uses power output from the driving battery.

16. The method according to claim 13, further comprising: when the battery is shifted from the low charge state to a normal state by being charged, notifying, by the notifying unit, the server of the shift to the normal state.

17. A vehicle comprising:
a driving battery supplying power to a power source for driving the vehicle;
a generating unit;
a battery different from the driving battery and charged with power generated by the generating unit;
an onboard equipment operating with power supplied from the battery; and
a notifying unit notifying a battery management server of a state of the battery by wireless communications,
wherein the generating unit generates the power by use of at least one of light, heat, and an electromagnetic wave,
the battery has a maximum charging capacity smaller than a maximum charging capacity of the driving battery,
the notifying unit includes a monitoring unit detecting a low charge state of the battery where a charge remaining amount of the battery is at or below a predetermined amount or an abnormal state of the battery, and
when the low charge state or the abnormal state is detected by the monitoring unit, the notifying unit notifies the battery management server of the detection of the low charge state or the abnormal state by wireless communications,
wherein the notifying unit is supplied power from the battery, and the notifying unit switches a power source from the battery to the driving battery when notifying the server of the low charge state.

* * * * *